United States Patent [19]
Dehlsen

[11] Patent Number: 5,066,339
[45] Date of Patent: Nov. 19, 1991

[54] ROTARY RADIATING BED THERMOPHOTOVOLTAIC PROCESS AND APPARATUS

[76] Inventor: James G. P. Dehlsen, 21221 Carriage Dr., Tehachapi, Calif. 93561

[21] Appl. No.: 514,921

[22] Filed: Apr. 26, 1990

[51] Int. Cl.$^5$ .......................................... H01L 31/058
[52] U.S. Cl. ................................................. 136/253
[58] Field of Search ........................................ 136/253

[56] References Cited

U.S. PATENT DOCUMENTS

| | | | |
|---|---|---|---|
| 1,064,263 | 6/1913 | Wallos | 34/85 |
| 2,348,673 | 5/1944 | Degner | 432/113 |
| 3,076,861 | 2/1963 | Samulon et al. | 136/257 |
| 3,097,833 | 7/1963 | Harris et al. | 432/106 |
| 3,441,259 | 4/1969 | Heyer et al. | 432/113 |
| 3,591,420 | 7/1971 | Streed | 136/257 |
| 3,929,510 | 12/1975 | Kittl | 136/247 |
| 4,191,530 | 3/1980 | Bearce | 432/107 |
| 4,234,352 | 11/1980 | Swanson | 136/253 |
| 4,313,024 | 1/1982 | Horne | 136/253 |
| 4,316,048 | 2/1982 | Woodall | 136/253 |
| 4,419,532 | 12/1983 | Severns | 136/253 |
| 4,451,231 | 5/1984 | Murray | 432/13 |
| 4,671,346 | 6/1987 | Masters et al. | 165/9.3 |
| 4,707,560 | 11/1987 | Hottel et al. | 136/253 |
| 4,782,768 | 11/1988 | Lee et al. | 110/246 |
| 4,836,862 | 6/1989 | Pelka et al. | 136/253 |
| 4,850,862 | 7/1989 | Bjerklie | 432/182 |
| 4,898,530 | 2/1990 | Wills et al. | 431/11 |
| 4,944,670 | 7/1990 | Watson | 431/166 |
| 4,948,365 | 8/1990 | Yuen | 432/103 |
| 4,976,611 | 12/1990 | Knop et al. | 432/181 |

FOREIGN PATENT DOCUMENTS 101086 12/1986 European Pat. Off. .

OTHER PUBLICATIONS

J. Werth, "Thermo-Photovoltaic Energy Conversion", General Motors Corp., *Proceedings 17th Power Sources Conference*, May (1963), pp. 23-27.
"Thermophotovoltaic Converter", General Motors Corp., Final Report, Contract No. DA 36-039-AM-C-02255E GM Defense Research Laboratories, Santa Barbara, California (Feb. 1964), pp. 1-2, 62-65.
C. R. Parent and R. E. Nelson, "Thermophotovoltaic Energy Conversion with a Novel Rare Earth Oxide Emitter", American Chemical Society, 1986, pp. 1314-1317.

*Primary Examiner*—Aaron Weisstuch
*Attorney, Agent, or Firm*—William W. Haefliger

[57] ABSTRACT

A combustion/emitter/regeneration process capable of operating at high temperature for sustained periods of time, that includes flowing reactants including fuel and air to a combustion zone; adding recuperated heat to at least two of the reactants flowing to the zone; combusting the reactants at the zone to produce combustion products at high temperature to heat a radiant emitter; extracting heat from the combustion products for return to the at least two of the reactants as the recuperated heat; removing the products of combustion at reduced temperature; and providing a porous bed which also functions as radiant emitter at and to which the extracted heat is transferred; rotating the bed about a rotation axis; and radiating light from the rotary bed and converting the radiated light into photovoltaic produced electricity.

25 Claims, 4 Drawing Sheets

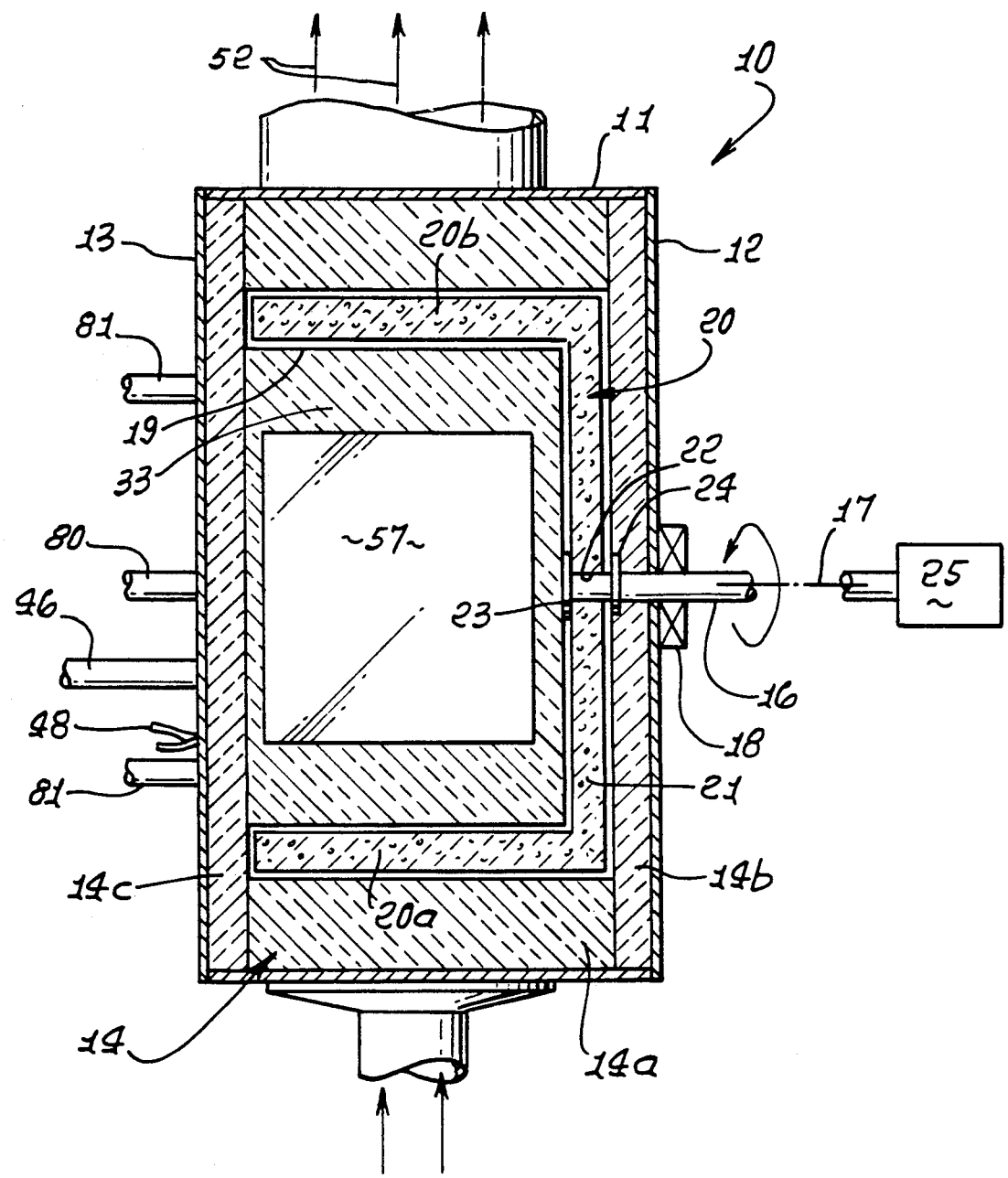

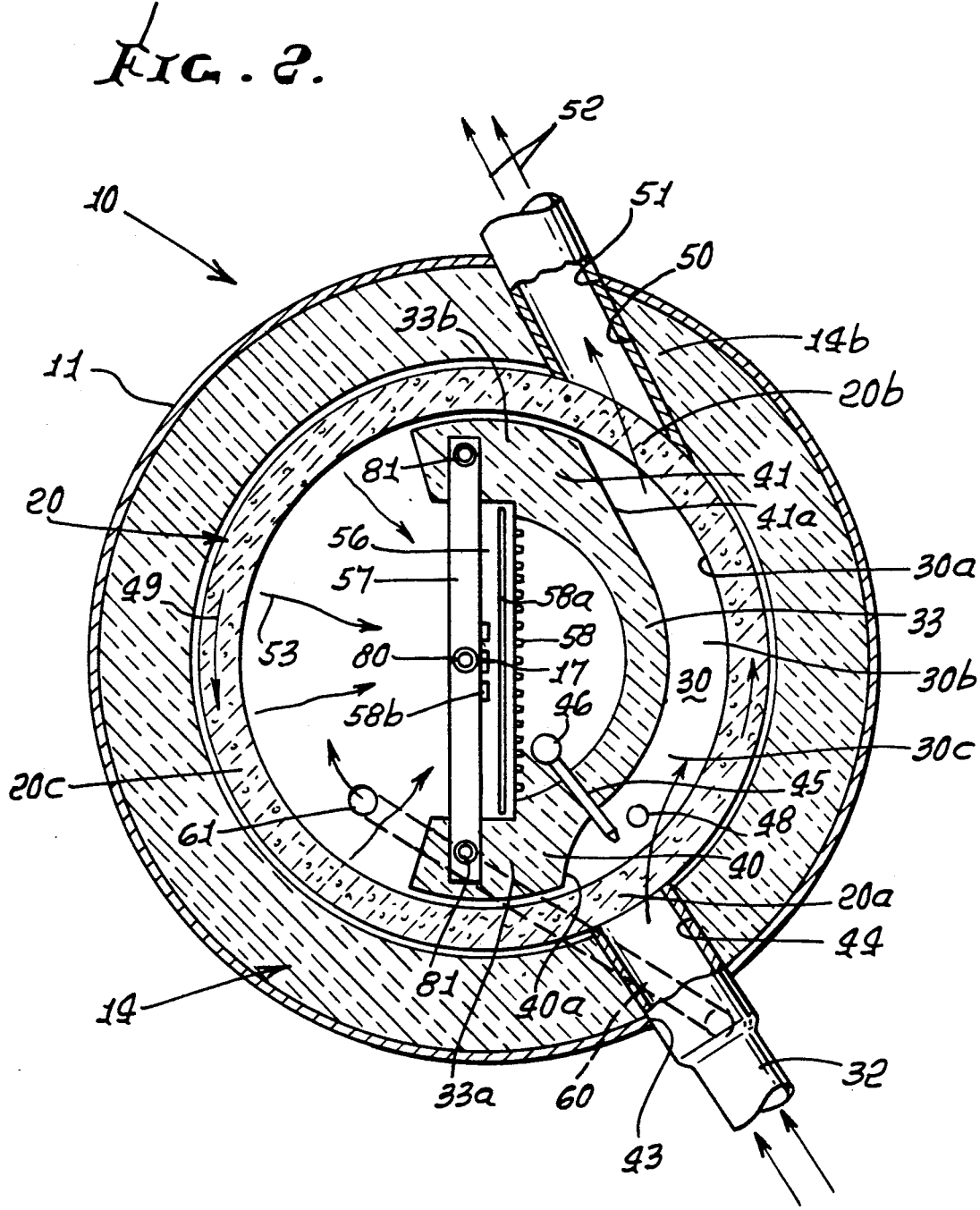

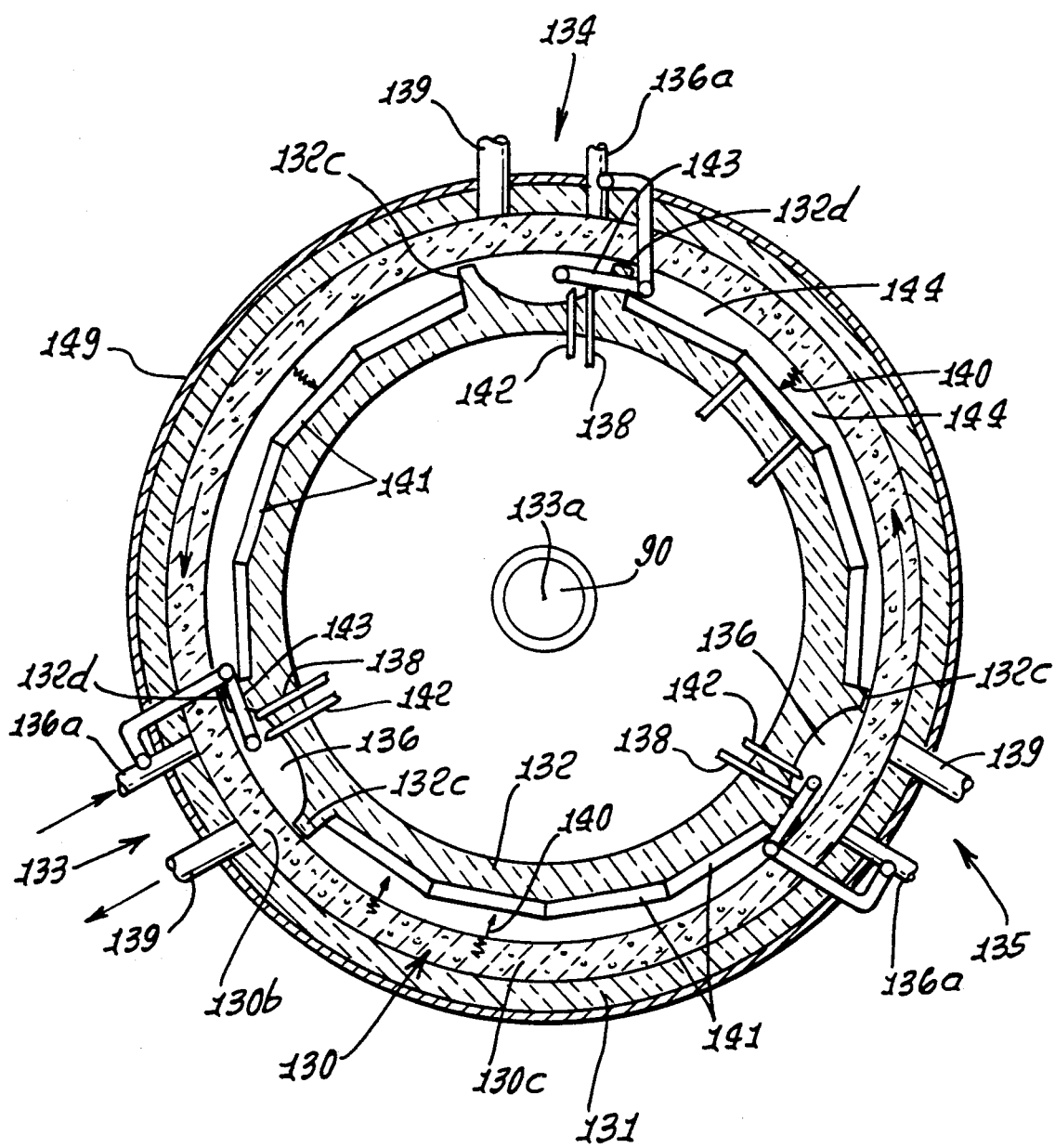

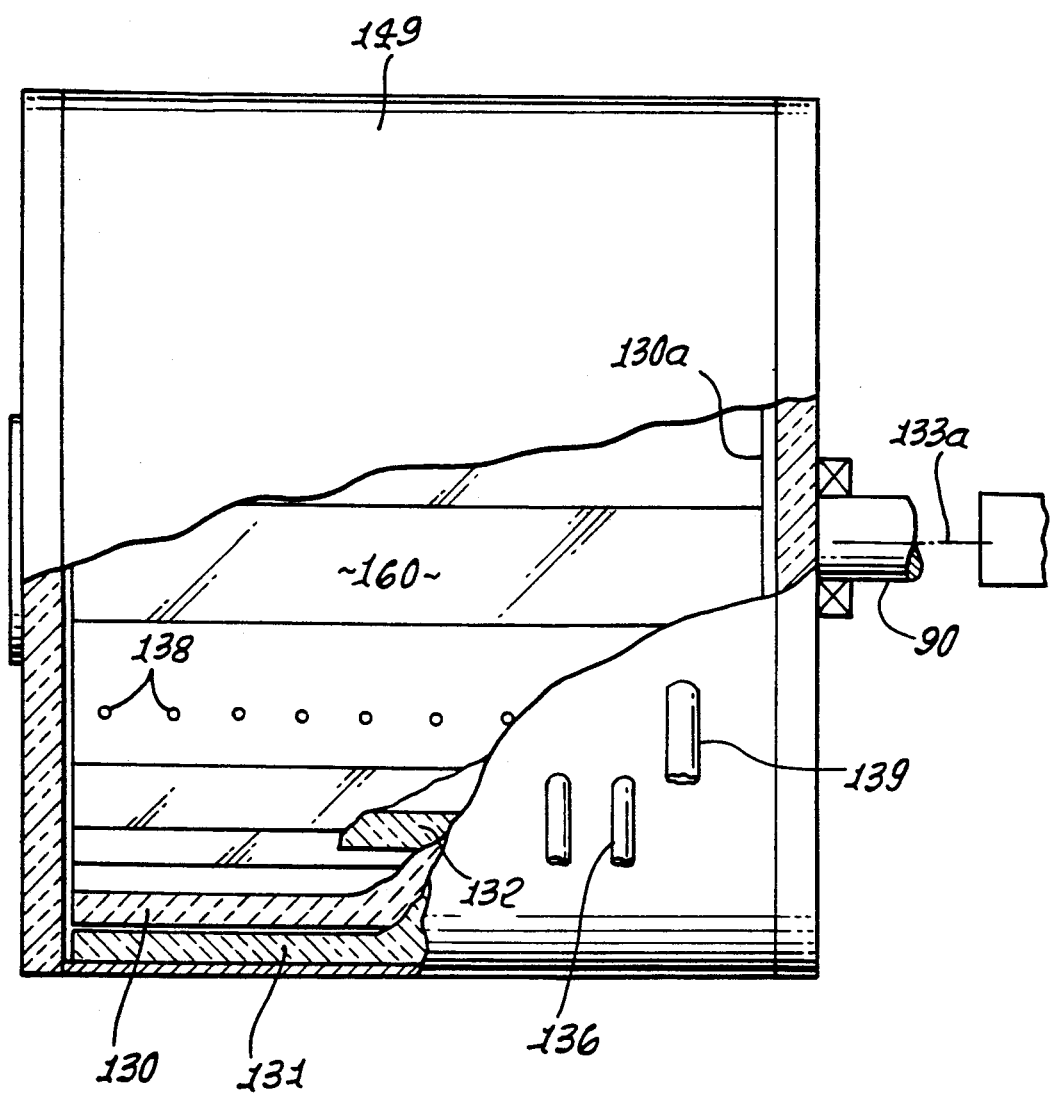

ROTARY RADIATING BED THERMOPHOTOVOLTAIC PROCESS AND APPARATUS

BACKGROUND OF THE INVENTION

This invention relates generally to combustion/emitter/regeneration processes, and more particularly to such a process wherein heated media is operable to radiate intense light for generation of electrical power by photovoltaic cells exposed thereto. The invention is particularly applicable to use with thermophotovoltaic (TPV) systems and generators.

It is known to provide a high temperature light radiator, heated by fuel combustion, to operate a photovoltaic cell. See for example U.S. Pat. No. 4,836,862 to Pelka. See also U.S. Pat. No. 4,948,365 to Yuen.

The present invention improves upon the process and apparatus described in the Pelka patent, through provision of a highly efficient, simple, compact rotary combustion/emitter/regeneration process and apparatus, wherein the flows of air and of combustion products are not periodically reversed, but proceed continuously in the same directions. Accordingly, the invention fulfills a need for such simple, highly efficient process and apparatus.

SUMMARY OF THE INVENTION

The process of the invention fundamentally concerns operation of a combustion/emitter/regeneration means for sustained periods of time and includes the steps:

a) flowing reactants including fuel and air to a combustion zone,
b) adding recuperated heat to at least two of the reactants flowing to the zone,
c) combusting the reactants at the zone to produce combustion products at high temperature to heat a radiant emitter,
d) extracting heat from the combustion products for return to the at least two of the reactants as the recuperated heat,
e) removing the products of combustion at reduced temperature, and
f) providing a porous bed at and to which the extracted heat is transferred,
g) rotating the bed about a rotation axis,
h) and radiating light from the inner surface of the rotary bed which serves as both radiant emitter and heat recuperator and converting the radiated light into thermophotovoltaic produced electricity.

Another object is to provide an improved process wherein the bed has a cylindrical wall, and the step a) includes flowing relatively cooler incoming air through heated extents of the rotating porous bed wall thereby providing heated air into the combustion zone. Further, step d) may then include flowing the high temperature combustion products through the rotating bed wall to transfer heat thereto.

Another object is to provide reactants in the porous bed to reduce the amount of undesirable emissions (nitrous oxide for example) from combustion products.

A further object is to provide an improved process, as referred to, wherein the cooler incoming air is caused to flow through the porous bed at a first location, and the combustion products are caused to flow through the porous bed at a second location spaced about the axis from the first location. The same extents of the rotating bed may then be caused to continuously pass through such first and second locations, which may be spaced about the bed rotation axis.

Yet another object of the invention is to provide thermally insulated material to substantially surround the rotating bed, and passing air inwardly through the material at an entrance locus, and passing the products of combustion through the material at an exit locus spaced about the axis spaced from the entrance locus.

An additional object concerns providing and locating a TPV cell within a hollow interior defined by the bed, to receive incident light radiating from the bed second location. The combustion may then be located within a first portion of the hollow interior, the photovoltaic cell or cells may be located within a second portion of the hollow interior, and the method includes the step of providing interior thermal insulation between the first and second portions of the hollow interior zone. Further, the interior thermal insulation may then be formed to present a convex surface toward a third location of the bed, and that convex surface spaced from the third location to form the combustion zone to extend arcuately about the axis of bed rotation, thereby causing the hot gases to flow closely adjacent and within the porous bed at the third location, for efficient heat transfer to the porous ceramic bed which at elevated temperatures radiates light.

Also, water cooled window means may be provided between the photovoltaic cell and a fourth location of the bed. In this regard, the referenced first through fourth locations associated with the rotating bed may be oriented in the following annular sequence about the rotor axis for efficient use of available space:

the first location
the third location
the second location
the fourth location

For larger generating devices, multiple combustion zones and associated ducts for air ingress and combustion gas egress may be provided in association with a single rotating porous emitter/bed.

Apparatus embodying the invention basically includes:

a) means for supplying reactants including fuel and air to flow toward a combustion zone,
b) a rotating porous bed for transferring recuperated heat to at least one of the reactants flowing to said zone via the bed, said zone located proximate said bed to produce combustion products at high temperature to locally heat the emitter/bed,
c) the rotating bed passing said hot combustion products for extracting heat from said products for return to said at least two of the supplied reactants as said recuperated heat,
d) means for rotating said bed about a rotation axis,
e) and means for receiving incident light radiating from said rotary emitter/bed and converting said radiated light into photovoltaic produced electricity.

These and other objects and advantages of the invention, as well as the details of an illustrative embodiment, will be more fully understood from the following specification and drawings, in which:

DRAWING DESCRIPTION

FIG. 1 is a side elevation taken in section, showing construction of the rotary apparatus embodying the invention;

FIG. 2 is a frontal elevation, taken in section, through the FIG. 1 apparatus to show interior construction;

FIG. 3 is a view like FIG. 2 showing a modification; and

FIG. 4 is a side elevation, partly in section, showing the FIG. 3 apparatus.

DETAILED DESCRIPTION

In FIGS. 1 and 2, the combustion/emitter/regenerator apparatus 10 includes a housing having a cylindrical outer wall 11, a rear wall 12, and a front wall 13. Within the housing is a thermally insulated chamber 14 including cylindrical section 14a, rear wall section 14b, and front wall section 14c. A rotor shaft 16 extends horizontally to define an axis 17 of rotation, and is supported at suitable bearings, indicated schematically at 18. The shaft extends through rear wall 12, through insulated rear wall section 14b, and through rear wall of a cylindrical rotor zone 19.

Within zone 19 is a rotor apparatus that includes a cylindrical bed 20 of porous ceramic material (such as alumina) having a rear wall 21. The bed is cup-shaped to open axially forwardly (leftwardly in FIG. 1) toward insulated wall section 14c. Shaft 16 passes through the rear wall 21 at bore 22, and the wall 21 is attached to the shaft via clamp plates 23 and 24, whereby the bed 20 and wall 21 rotate with the shaft, as a unit. A drive for the shaft is schematically indicated at 25.

A combustion zone 30 is formed within the interior space, inwardly of the bed 20. That zone extends arcuately about central axis 17, the axis of shaft and rotor rotation, and between the inner concave wall 30a of the bed 30 at third location 30b and interior thermal insulation 33. The latter extends annularly between locations 33a and 33b at opposite sides of the axis 17 and is non-rotatable.

Baffle sections of thermal insulation extend at 40 and 41, as shown and provide guide surfaces 40a and 41a presented toward and at the beginning and end of zone 30. As air flows inwardly from duct 32 through openings 43 in wall 11 and 44 in insulation section 14a, and through the porous bed at first location 20a, the curved guide surface 40a deflects the now heated air flow to pass lengthwise along the zone 30 for mixing with combustible fuel ($CH_4$ for example) delivered to zone 30 via pipe 45. See also fuel supply ducting 46. An igniter 48 projecting in zone 30 ignites the fuel/air mixture to produce flames in region 30c of zone 30. The hot products of combustion (at around 1,600° C. for example) are subsequently guided by surface 41a toward and outwardly through the bed 20 at second location 20b. The hot gases heat the bed at that location, all portions of the bed continuously arriving at that location being so heated, as the bed and rotor rotate in the direction of arrow 49. The gases at reduced temperature then pass through opening 50 in the insulation section 14b and 51 in wall 11, as indicated by arrows 52. Openings 43 and 44 may be regarded as entrance loci, and openings 50 and 51 as exit loci.

The hot bed wall extent at a fourth location 20c radiates light at 53 toward photovoltaic cell means supported and extending within a second portion of the rotor hollow interior. (Insulation 33 extends within a first portion of the hollow interior zone, as best seen in FIG. 2.) The photovoltaic cell or cells 56 typically extend in a plane parallel to shaft 16 and axis 17, and facing the location 20c referred to. Water cooled windows 57 (glass-enclosed, circulating water-containing zones) between radiant bed 20c and photovoltaic cells 56 protect the cells from direct contact with hot gases and/or flames. On photovoltaic cells 56 are mounted heat dissipating fins 58 which receive air in through ducts 58a and exhausts warm air through ducts 58b. Air ducts pass through plate 13 and insulation 14c flowing incoming air over the light-receiving receiving side of the cells and returning over the cooling fin side of the cells 56. Accordingly, the hot bed loses some heat at fourth location 20c, and rotates again into registration with the air inlet openings 43 and 44 to exchange heat with such incoming air for high efficiency.

The TPV cells, water-cooled windows, and guide surfaces 40a and 41a extend parallel to axis 16, within the interior of the rotor, as indicated, and between opposite ends thereof. Water inlet and outlet ducts appear at 80 and 81. Water-cooled window incorporates an optical coating to transmit light radiation of wavelengths best suited to activate photovoltaic cells, and reflect back to the bed all other radiation.

An air pressure equalizer duct 60 extends into the rotor interior to deliver pressurized air at 61 to that interior near the cells, thereby preventing ingress of hot gases into that region, via interior interstices.

In FIGS. 3 and 4, the modified regenerator includes a rotating cylindrical bed 130, as in FIGS. 1–3, that may consist of porous ceramic, such as alumina. A non-rotating annulus of thermal insulation extends at 131, closely about the bed. Likewise, a non-rotating annular core of thermal insulation extends at 132, inwardly of the bed 130. Drive shaft 90 is connected with end wall 130a of 130.

At three locations, 133–135, about the common axis 133a, air is caused to flow via ducts 136a through 131 and through bed 130 at locations 130b for reception in local combustion zones or pockets 136 formed by insulation 132. Legs 132c and d of insulation 132 seal off pockets 136. After ignition with combustible gas ($CH_4$ for example) supplied to zones 136 via pipes 138, the hot products of combustion flow back through the bed at locations 130b to exit via ducts 139 passing through insulation 131. The bed is thereby locally heated at multiple locations 130b, and progressively as the bed rotates, whereby the hot bed at intermediate circumferential locations 130c radiates light at 140 toward and against the non-rotary photovoltaic cells 160 mounted behind water-cooled windows 141 carried by core 132 and presented radiantly outwardly, as shown. Entering air is locally preheated at locations 130a, prior to its mixing and combustion with $CH_4$. Igniters are shown at 142, and air pressure equalizer ducts 143 supply air pressure to the spaces or regions 144 between 130c and 141, to prevent ingress of hot gases to such zones.

Thermal insulation extends at opposite ends of the annulus 131 to enclose the regenerator interior. An outer metallic housing is indicated at 149.

I claim:

1. A combustion/emitter/regeneration process capable of operating at high temperature for sustained periods of time, that includes
    a) flowing reactants including fuel and air to a combustion zone,
    b) adding recuperated heat to at least two of the reactants flowing to said zone,
    c) combusting the reactants at said zone to produce combustion products at high temperature, d) extracting heat from said combustion products for return to said at least one of the reactants as said recuperated heat,
e) removing the products of combustion at reduced temperature, and
f) providing a porous bed at and to which said extracted heat is transferred,
g) rotating said bed about a rotation axis,
h) and radiating light from said hot rotary bed and converting said radiated light into photovoltaic produced electricity,
i) said bed having a cylindrical wall, and said step a) including flowing relatively cooler air through heated extents of said rotating bed wall into said combustion zone,
j) said step d) including flowing said high temperature combustion products through said rotating bed wall to transfer heat thereto,
k) causing said cooler air to flow through the bed at a first location, and causing said combustion products to flow through the bed at a second location spaced about said axis from said first location,
l) and providing and locating a photovoltaic cell within a hollow interior defined by the bed, to receive incident light radiating inwardly from said bed spaced from said second location and said first location.

2. The method of claim 1 including causing the same extents of the bed to pass through said first and second locations as a consequence of said rotation.

3. The method of claim 1 including providing thermally insulated material to substantially surround said rotating bed, and passing air inwardly through said material at an entrance locus, and passing said products of combustion through said material at an exit locus about said axis spaced from said entrance locus.

4. The method of claim 1 wherein said combustion zone is located within a first portion of said hollow interior, the photovoltaic cell is located within a second portion of said hollow interior, and including the step of providing interior thermal insulation between said first and second portions of the hollow interior.

5. The method of claim 4 including forming said interior thermal insulation to present a convex surface toward a third location of the bed, and spacing said convex surface from said third location to position said combustion zone to extend arcuately about said axis, thereby causing said hot gases to flow closely adjacent and within the porous bed at said third location.

6. The method of claim 5 including providing water-cooled window means, with optical coatings, between photovoltaic cell and a fourth location of the bed, to prevent hot gases from contacting the photovoltaic cells, and delivering cool air to the front of photovoltaic cells and to circulate across cooling fins at the rear of the photovoltaic cells, and then to exit.

7. The method of claim 6 including orienting said first, second, third, and fourth locations in the following sequence about said axis:
the first location
the third location
the second location
the fourth location 8. The method of claim 4 including flowing pressurized gas to said second portion of the hollow interior to prevent access to said second portion of hot gases from said first portion.

9. The method of claim 1 wherein groups of said first and second locations are spaced about said axis, including supplying pressurized air to each of said locations for flow inwardly through the bed.

10. The method of claim 9 wherein there are multiples of said combustion zones respectively associated with said groups of first and second locations, and including rotating said bed past each of said combustion zones.

11. The method of claim 9 including locating a photovoltaic cell means spaced inwardly from a heated section of the rotating bed, and supplying pressurized gas to the space between said cell means and the bed heated section.

12. A combustion/emitter/regenerator apparatus capable of operating at high temperature for sustained periods of time, that includes in combination:
a) means for supplying reactants including fuel and air to flow toward a combustion zone,
b) a rotating porous bed for transferring recuperated heat to at least one of the reactants flowing to said zone via the bed, said zone located proximate said bed to produce combustion products at high temperature to locally heat the bed,
c) the bed passing said hot combustion products for extracting heat from said products for return to said at least one of the supplied reactants as said recuperated heat,
d) means for rotating said bed about a rotation axis,
e) and means located radially inwardly of said rotating bed for receiving incident light radiating from said rotary bed and converting said radiated light into photovoltaic produced electricity.

13. The combination of claim 12 wherein said bed has a cylindrical wall, and said air flows through heated extents of said rotating bed wall into said combustion zone.

14. The combination of claim 13 including guide means for guiding flow of said high temperature combustion products through said rotating bed wall to transfer heat thereto.

15. The method of claim 14 including air inlet means for causing cooler air to flow through the bed at a first location, and outlet means for causing said combustion products to flow through the bed at a second location spaced about said axis from said first location.

16. The method of claim 15 wherein the same extents of the bed repeatedly pass through said first and second locations which are located circumferentially about said axis.

17. The combination of claim 15 wherein said means e) includes a photovoltaic cell located within a hollow interior defined by the bed, to receive impingement of light radiating from said bed second location.

18. The combination of claim 17 wherein said combustion zone is located within a first portion of said hollow interior, the photovoltaic cell is located within a second portion of said hollow interior, there being internal thermal insulation between said first and second portions of the hollow interior zone.

19. The combination of claim 18 wherein said interior thermal insulation presents a convex surface toward a third location of the bed, said convex surface spaced from said third location to position said combustion zone to extend arcuately about said axis, thereby causing said hot gases to flow closely adjacent and within the porous bed at said third location.

20. The combination of claim 19 including water-cooled window means between the photoveltaic cell and a fourth location of the bed.

21. The combination of claim 20 wherein said first, second, third, and fourth locations are oriented in the following sequence about said axis:
 the first location
 the third location
 the second location
 the fourth location 22. The combination of claim 15 wherein groups of said first and second locations are spaced about said axis, pressurized air being supplied to each of said locations for flow inwardly through the bed 23. The combination of claim 22 wherein there are multiples of said combustion zones respectively associated with said groups of first and second locations, the bed rotating past each of said combustion zones.

24. The method of claim 12 including thermally insulated material substantially surrounding said rotating bed for passing air inwardly through said material at an entrance locus, and for passing said products of combustion through said material at an exit locus about said axis spaced from said entrance locus.

25. The combination of claim 12 wherein said means e) includes photovoltaic cell means in such association with said rotating bed as to receive incident light radiating from the bed.

* * * * *